Feb. 8, 1927.
F. L. PRUETT
1,616,867
INSURANCE CASH REGISTER
Filed Feb. 5, 1924
4 Sheets-Sheet 1
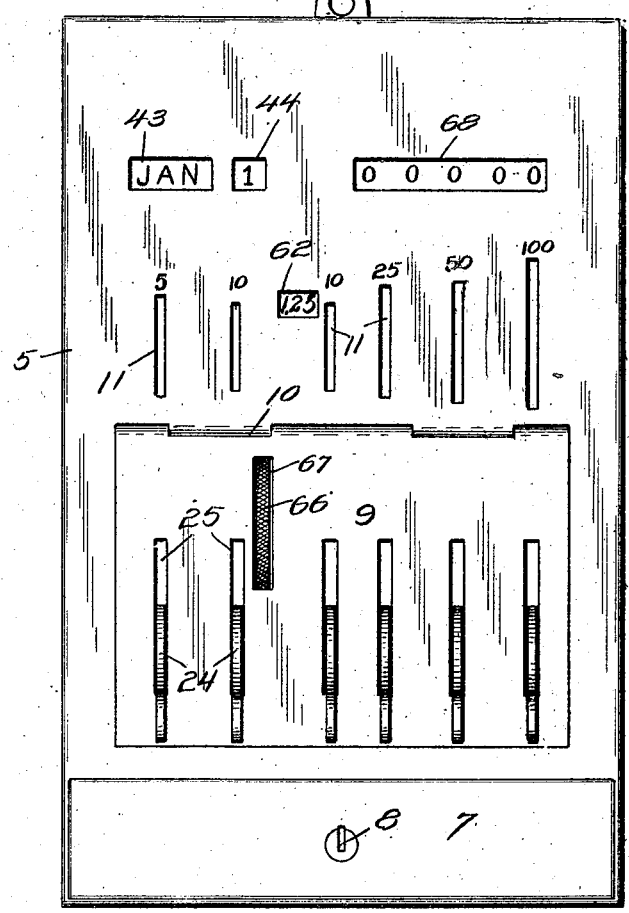
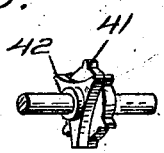
Inventor
F. L. Pruett.
Witness.

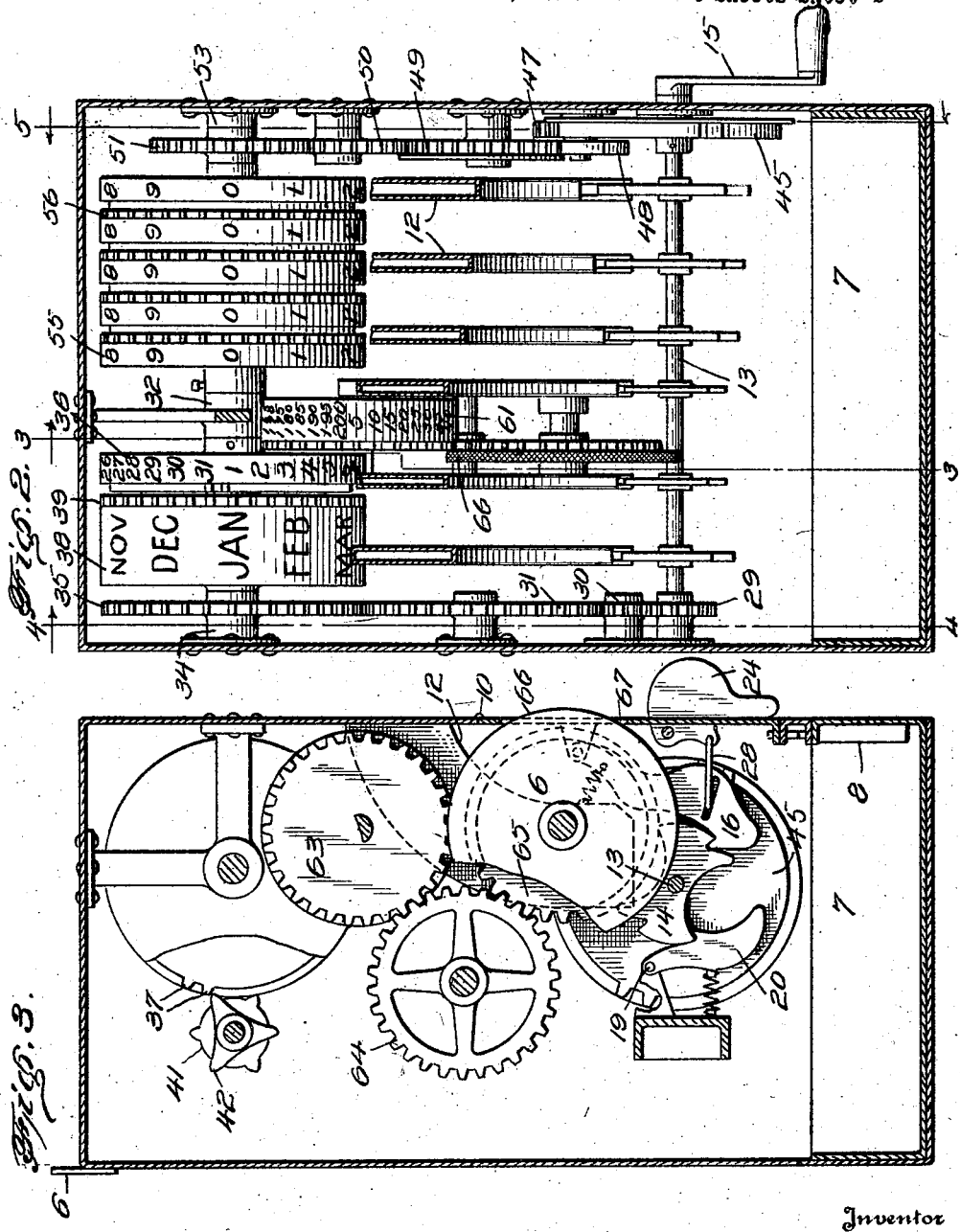

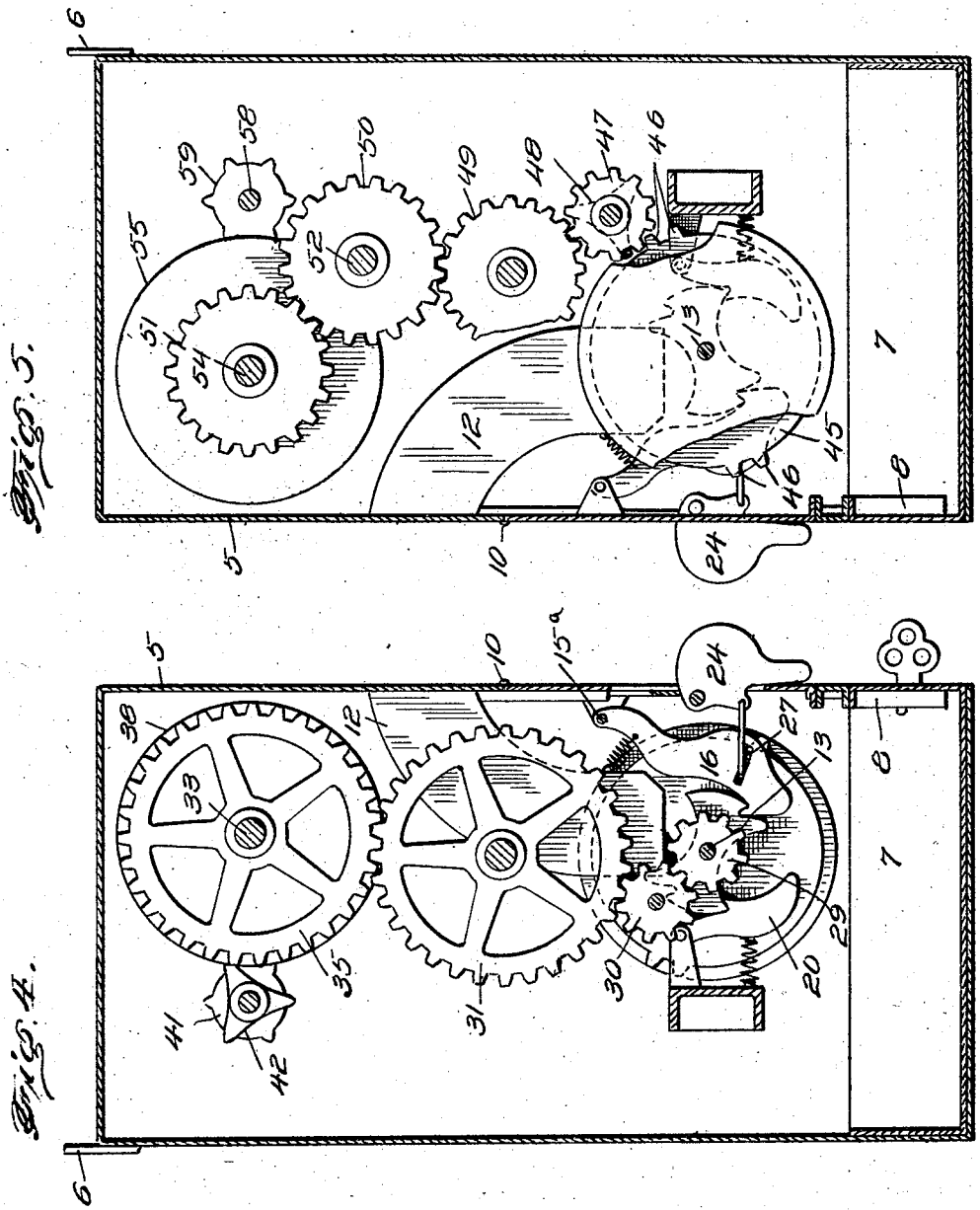

Feb. 8, 1927.
F. L. PRUETT
1,616,867
INSURANCE CASH REGISTER
Filed Feb. 5, 1924
4 Sheets-Sheet 4
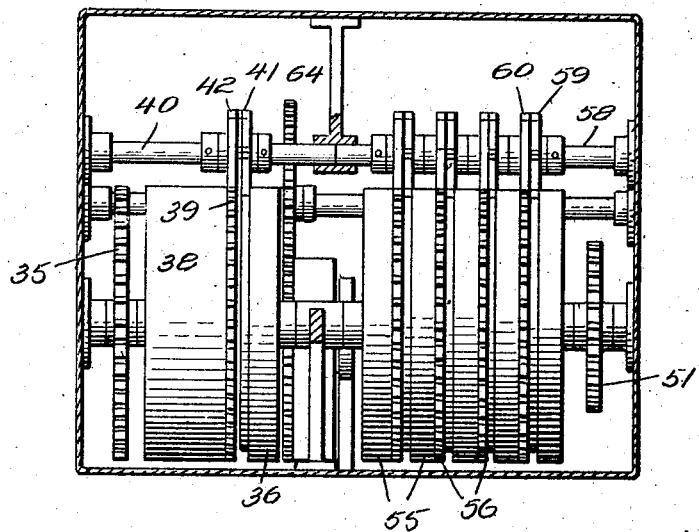
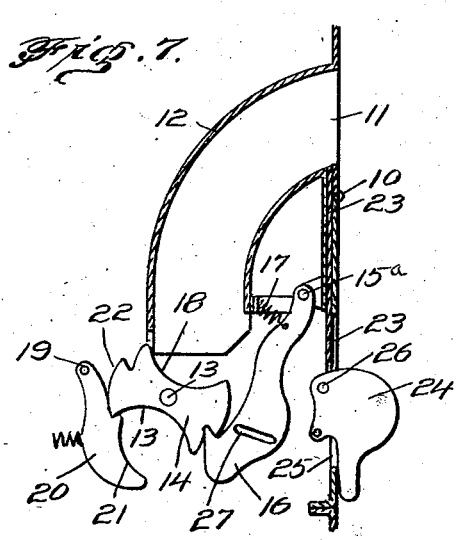
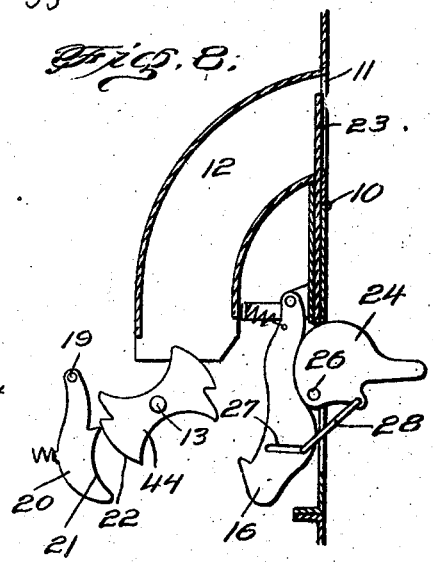
Inventor
F. L. Pruett.
Witness.
F. C. Gibson.

Patented Feb. 8, 1927.

1,616,867

UNITED STATES PATENT OFFICE.

FORREST L. PRUETT, OF JACKSON, TENNESSEE, ASSIGNOR OF ONE-HALF TO WILLIAM A. POOLE, OF JACKSON, TENNESSEE.

INSURANCE CASH REGISTER.

Application filed February 5, 1924. Serial No. 690,778.

This invention relates to certain new and useful improvements in registering boxes, and has particular reference to a device which may be termed an insurance cash register.

Briefly described, the invention embodies a coin deposit and collection receptacle provided with registering mechanism that is releasable for permitting its manual operation, when the premium payee deposits coins in the receptacle corresponding to the amount of the weekly premium to be paid, the registering mechanism embodying a manually operable operating shaft that is released by the coin deposited in the receptacle for permitting partial rotation thereof, whereby the indicating elements are permitted to be advanced the proper degree so that the register will at all times accurately indicate the total number of weekly premiums paid and the date to which the insurance is paid.

The invention contemplates the provision of a coin deposit and collection receptacle of the above character wherein provision is made for permitting the use of the device for registering the total number of weeks paid and the date to which the insurance is paid irrespective of the amount of the premium to be paid, and wherein provision is made for preventing the operation of the registering mechanism until the required amount of coin is deposited in the receptacle, still further provision being made to permit setting of the device so that the registering mechanism will be released upon depositing of coins totalling any desired one of a number of predetermined weekly premiums.

Another object of the invention is to provide an insurance cash register of the above character embodying registering mechanism for indicating the date to which the insurance is paid and the total number of weeks paid, the device embodying a plurality of coin chutes for reception of coins of different denominations, the registering mechanism embodying an operating shaft normally held from rotation by pivoted locking elements, one of which is associated with each of the coin chutes and releasable by coins deposited therein, means being provided for permitting any desired ones of said chutes to be manually closed and the locking members associated therewith to be simultaneously rendered inoperative whereby the only operative locking members are those associated with the uncovered chutes which are adapted for reception of coins aggregating the required weekly premium to be paid and deposited.

Another object of the invention is to provide an insurance cash register of the above character which is extremely simple and durable in construction, as well as efficient and reliable in operation and wherein no special skill is required in the operation of the device.

Other objects will appear as the nature of the invention is better understood and the same consists in the novel form, combination, and arrangement of parts hereinafter more fully described, shown in the accompanying drawings and claimed.

In the drawings wherein like reference characters indicate corresponding parts throughout the several views:

Figure 1 is a front elevational view of an insurance cash register constructed in accordance with the present invention.

Figure 2 is a vertical transverse sectional view of the device shown in Figure 1, taken adjacent the front wall of the casing.

Figure 3 is a vertical longitudinal sectional view taken substantially upon the line 3—3 of Figure 2, Figure 4 is a view similar to Figure 3, taken substantially upon the line 4—4 of Figure 2.

Figure 5 is a view similar to Figure 4, taken upon the line 5—5 of Figure 2.

Figure 6 is a horizontal sectional view taken on a plane directly beneath the top wall of the casing.

Figure 7 is a fragmentary vertical longitudinal sectional view taken through one of the coined chutes and adjacent parts to illustrate details of the chute closures, and register locking means, one of the locks being shown in locking position, and Figure 8 is a view similar to Figure 7 with the lockng member released and the chutes closed.

Figure 9 is a perspective view of one of the details.

Referring more in detail to the drawings, the present invention embodies a suitable casing 5 that is composed of top, bottom, side, rear and front walls and which may be provided with any suitable means as at 6 for facilitating attachment of the same to a wall, door or other support. The front wall of the casing 5 is provided in its lower end with a slot through which is slidably movable a drawer 7 that is disposed upon the bottom wall of the casing, which drawer is provided with a suitable key controlled lock as at 8. The lower portions of the front wall of the casing 5 directly above the drawer 7 is formed with a hinged door as at 9 that is pivoted to swing vertically from its upper edge as at 10, and the bolt of the lock 8 is adapted to simultaneously lock the drawer 7 closed and to also lock the door 9 closed.

The front wall of the casing 5 is provided with a horizontal series of slots as at 11 disposed in side by side spaced relation and of differing sizes so as to adapt the same for the reception of coins of differing denominations as indicated above the respective slots, the latter being provided at a point above the upper edge of the door 9 as shown more clearly in Figure 1. Rigid with the front wall of the casing 5 and projecting inwardly and downwardly therefrom are a plurality of parallel vertically disposed coin chutes 12, each of which has its upper end fixed to the front wall of the casing in communication with one of the slots 11 and is disposed with its lower end arranged to discharge coins into the drawer 7 when the latter is closed.

A transverse horizontal shaft 13 is journalled in the sides of the casing 5 directly beneath the lower discharge ends of the chutes 12, and fixed upon this shaft 13 at intervals are a plurality of double ended keeper elements 14, one of which is disposed directly beneath the lower end of each of the chutes 12. One end of the shaft 13 projects through a side wall of the casing 5 and has a hand crank 15 fixed thereon. A horizontal transversely disposed hanger rod 15ª is mounted within the casing forwardly of the lower ends of the chutes 12, and pivotally suspended from this hanger rod 15ª are a plurality of locking elements or hooks 16 that are adapted to swing toward and away from the shaft 13. A locking element or hook 16 is associated with each keeper element 14, and these locking elements 16 are normally swung toward their respective keeper elements 14 by means of tension springs 17, so that the hooked lower ends of the locking elements 16 are normally engaged with their keeper elements 14 for preventing rotation of the shaft 13 as seen best in Figure 7, the keeper element 14 being in a forwardly and downwardly inclined position when engaged or locked. The opposite sides of the keeper elements 14 are concaved as at 18, and by reason of the inclined normal positions of these keeper elements 14, the coins deposited in the slot 12 will be received in a concaved side of the adjacent keeper element 14 and directed forwardly against the locking element 16 so as to act to release the lever under the action of gravity.

A second horizontal transversely extending hanger rod 19 is mounted in the casing rearwardly of the lower ends of the chutes 12 and pivotally suspended from this hanger rod 19 are a plurality of spring pressed pawls 20, adapted to engage the higher ends of the keeper elements 14 for preventing retrograde movement of shaft 13 at all times. The forward lower edge portions of the pawls 20 are of concaved form as at 21 to correspond with the curved formation of the ends of the keeper element 14 as indicated at 22, so that the pawls 20 will not interfere with the rotation of shaft 13 in a clockwise direction when the locking elements 16 are released.

Vertically sliding closure plates 23 are provided for the several coin chutes 12 adapted for closing the upper ends of the latter and the slots 11. These closure plates 23 are mounted against the rear side of the front wall of the casing and are engaged at their lower ends upon the edges of cam levers 24 that are pivotally mounted in slots 25 provided in the door 9 for forward and rearward swinging movement as at 26. The locking elements 16 are provided with transversely extending elongated slots as at 27, in which are slidably and pivotally connected the inner ends of links 28, the outer ends of the links 28 being connected to the cam levers 24, so that when the cam levers 24 are raised, the sliding closure plates 23 will be elevated to closing position and the locking elements 16 will be released from the keeper elements 14, the release of the locking elements 16 being, however, freely permitted under the influence of the weight of coin inserted in the coin chutes which are not closed.

Fixed upon one end of the shaft 13 is a relatively small spur gear 29 that meshes with another small spur gear 30 journalled upon a suitable stub shaft fixed to the adjacent side wall of the casing, the gear 30 in turn meshing with a larger spur gear 31 also journalled upon a stub shaft fixed to said side wall of the casing. A bearing 32 is disposed within the upper portion of the casing and supported by means of a bracket rigidly secured to the top wall of the casing as shown in Figure 2, and a shaft 33 as shown in Figure 4 has one end journalled in this bearing 32 and its other end journalled in a bearing indicated at 34 in Figure 2, which bearing 34 is fixed to the adjacent side wall of the casing 5. Fixed upon the outer end portion of the shaft 33 is a large spur gear 35 which meshes with and is disposed above the gear 31 as shown in Figure 4. A relatively narrow drum 36 is secured upon the inner end portion of the shaft 33 and suitably provided upon the periphery of this drum are numbers progressing from 1 to 31 inclusive and representative of the days of the month. The drum 36 at one side is in the form of a mutilated gear embodying a pair of teeth as shown at 37 in Figure 3. Freely rotatable upon the shaft 33 between the drum 36 and the gear 35 is a wider drum 38 upon the periphery of which is printed or otherwise provided the successive months of the year. The drum 38 is formed at its inner side to provide a continuous spur gear as indicated at 39, and suitably journalled transversely of the casing rearwardly of the shaft 33 is a shaft 40 which carries rigidly connected gears 41 and 42 that respectively have six and three teeth and respectively cooperate with the mutilated gear of the drum 36 and the gear 39 of the drum 38, whereby rotation is intermittently imparted to the drum 38 from the drum 36 which is secured upon the shaft 33.

The front wall of the casing 5 is provided with openings as shown at 43 and 44 in Figure 1, thru which the months of the year printed on the drum 38 and the days of the month printed on the drum 36 are visible, such openings being preferably closed by transparent panels not shown in the finished machine.

Secured upon the other end of the shaft 13 is a relatively large mutilated gear 45 that is provided with four teeth arranged in diametrically opposed pairs as indicated at 46 in Figure 5. A spur pinion 47 is suitably journalled on a stub shaft fixed to the adjacent side wall of the casing 5, and the teeth of this pinion 47 are adapted to be engaged intermittently by the pairs of teeth 46 upon the gear 45. Fixed to and disposed beside the pinion 47 is a three tooth gear 48 which cooperates with a relatively large spur gear 49 that is mounted upon a stub shaft fixed to the adjacent side wall of the casing 5 and that meshes with another spur gear 50 also journalled upon another stub shaft carried by the adjacent side wall of the casing. Another spur gear 51 is mounted upon a shaft that is journalled in a transverse horizontal position in alignment with the shaft 33 and supported at its ends by the bearing 32 and a bearing 53 supported by the adjacent side wall of the casing 5, and this spur gear 51 is disposed above and meshes with the spur gear 50 as shown in Figures 2 and 5. Journalled upon the shaft 54 which carries the gear 51 are a plurality of drums 55 having numbers printed upon the peripheries thereof, progressively increasing from zero to 9 as shown in Figure 2, and the end drum 55 adjacent the gear 51 is formed at its inner side with a mutilated gear embodying a pair of teeth similar to the teeth 37 of the drum 36. The remaining drums 55 are provided at one side with integral gear teeth forming spur gears 56, and all of the drums 55 disposed between the end ones of said drums are provided upon their opposite sides with mutilated gears embodying pairs of teeth similar to the pair of teeth 37 of the mutilated gear formed on the drum 36. A horizontal transverse shaft 58 is journalled in the casing rearwardly of the shaft 54, and journalled upon this shaft 58 are a plurality of pairs of gears, each pair of which comprises a six toothed gear 59 rigid with a three toothed gear 60. The six toothed gear 59 is disposed to be engaged by the teeth of the mutilated gear of each of the drums 55 and the three toothed gear 60 is provided to be engaged by the teeth of the continuous gear 56 of said drums 55. The gearings described comprise means whereby a half revolution of shaft 13 will be productive of the advancement of the right hand drum 55 for a distance equal to one unit, and to provide for the advancement of the next adjacent drum 55 one unit when the preceding drum has completed a revolution. This operation is generally well known in the calculator art, and further detailed description of the same, per se, is deemed unnecessary. In other words, the construction embodies a conventional counting mechanism, which in the present instance is utilized to indicate the grand total of weeks paid, and wherein the counting mechanism is advanced one unit or week upon each revolution of the shaft 13.

It is here noted that the gearing between the shaft 13 and the drums 38 and 36 provide for the advancement of the drum 36 a distance equal to seven days upon each half revolution of shaft 13 and for the rotation of the drum 38 from one month to the other upon each complete rotation of the drum 36.

Suitably journalled within the casing between the inner one of the drums 55 and the drum 36 and beneath the bearing 32 is a further drum 61, upon the periphery of which is marked or printed progressive denominations representing the different amounts which might be representative of premiums to be paid upon an insurance policy, and the front wall of the casing 5 is provided with an opening as at 62 through which these indications are visible, which opening is preferably closed by means of a transparent panel. Formed upon the drum 61 at one side thereof is a relatively large spur gear 63 which meshes with another spur gear 64, disposed therebeneath, the spur gear 64 in turn meshing with another spur gear 65 that is rotatably mounted behind the door 9, and that has a milled disc 66 rigid therewith, the forward portion of which projects outwardly through a slot 67 provided in the door 9. It will thus be seen that the disc 66 may be manually rotated so as to rotate the drum 61 through the gearing described, and thereby set the latter so that the desired weekly premium amount may be exposed through the opening 62 of the casing. The front wall of the casing 5 is further provided with another opening as at 68 beside the openings 43 and 44 through which the numerals on the drums 55 are visible, said openings 68 being preferably closed by a transparent panel suitably mounted in place.

The present register is to be used by industrial insurance companies for the purpose of facilitating collection of weekly premiums and one register is left in the home of each of the premium payees who have taken out insurance policies with the company. The register is set to indicate the exact weekly premium to be paid by the party in whose home the register is left, by manually rotating the wheel 66 until the proper numeral on the drum 61 is exposed through the opening 62 of the casing 5. Assuming that the weekly premium to be paid amounts to $1.25, all of the slots 11 are closed except the $1 slot and the $.25 slot by swinging the cam levers 24 upwardly to the position shown in Figure 8, which results in rendering inoperative the locking members 16 associated with all of the slots except these two. The links 28 of the remaining locking members 16 are then removed so that these locking members may only be released by the coins deposited in the chutes 12 which lead from the two slots employed in this particular instance. The premium payee can, at any time, during the week place his or her weekly premium in the register, and the insurance is indicated as being paid, while the date to which the insurance is paid is also shown. The premium payee needs no other receipt and if the premium payee does not care to be bothered by the agent or should want to go out, he or she can place the register on the outside of the wall or door of the dwelling so that when the agent calls upon his regular call day, he may have access to and unlock the register by releasing the lock 8 whereby the drawer 7 may be withdrawn and the money removed, the agent immediately marking his own collection book and going on to the next call. In this manner the agent saves the time of having to wait for the premium payee to answer the door and look up the ordinary receipt book and money. The average agent spends about one third of his time in making back calls or such calls as deal with persons who were not at home when the agent called on his regular day. The use of a register of this kind will eliminate this loss and waste of time. When an inspection is made, the present number is taken down, the previous number then subtracted and the result shows the exact number of weeks this particular agent has collected for. The register will of course remain the property of the company and if the insurance lapses the company will remove the register, while the agent carries a skeleton key which fits any register on his route and the policy holders have no keys. The use of the present device is safe for the policy holder and it will result in saving the company for printing new premium receipt cards, or books each year.

When the premium payee deposits the required coins in the slots 11 which are not closed by the slides 23, such coins will fall by gravity downwardly through the chutes 12 aligned with the open slots 11 and due to the inclined position of the keeper element 14 the coins will be directed forwardly against the operative locking members 16, so as to release the latter against the actions of the springs 17 thereof. The handle 15 may then be manually turned one-half revolution which results in the opposite end of the operative keeper members 14 being again engaged by the latch or locking elements 16 thereof for preventing further rotation of the shaft 13. When this is taking place, the coin which has been deposited will be dropped from the concaved side 18 of the operative keeper elements 14 into the drawer 7. The turning of the shaft 13 for a half revolution results in moving the drums 55 in such manner that the numeral exposed through the opening 68 is turned one unit for each operation of the handle 15, thus accurately indicating or registering the total number of weeks paid by the premium payee. When the shaft 13 is rotated as above set forth, the drum 36 is also advanced through the gearing described for a distance equal to seven days, and at the proper time the month exposed through the opening 43 is changed so that the data visible through the openings 43 and 44 shows the exact date through which the policy is paid by reason of the fact that the date is advanced one week each time a unit is added to the total indicated through the window or opening 68. By mounting the locking element 16 upon the rear face of the drawer 7 and similarly mounting the cam levers 24 and the wheel 66 upon said drawer 7 it is obvious that when the bolt of the lock 8 is released, the door 9 may be swung outwardly and upwardly for permitting access to the interior mechanism should the occasion require the same. The pawls 20 will act to engage the keeper elements 14 when properly positioned for engagement by the locking element 16 so as to prevent retrograde or anti-clockwise rotation of shaft 13, thereby retaining the device set for the next succeeding operation.

From the foregoing description it is believed that the construction and operation, as well as the advantages of the present invention will be readily understood and appreciated by those skilled in the art.

What I claim as new is:

1. In an insurance cash register of the character described, a casing provided with a coin receptacle and having slots to receive coins of different denominations, lock controlled means for preventing unauthorized access to said coin receptacle, depending coin chutes associated with said slots and arranged to discharge into said coin receptacle, a manually movable member, coin releasable means associated with each of said chutes for normally preventing movement of said manually movable member in one direction and for automatically arresting the same after moving in said direction for a predetermined distance upon being released by the coin, means to prevent retrograde movement of said manually movable member, and manually operable means associated with said coin releasable means for rendering any desired ones of the same inoperative, whereby the register may be set for reception of coins aggregating any desired predetermined premium, said last named means embodying a removable element whereby the remaining coin releasable means may only be released by the operation of a coin.

2. In an insurance cash register of the character described, a casing provided with a coin receptacle and having slots to receive coins of different denominations, lock controlled means for preventing unauthorized access to said coin receptacle, depending coin chutes associated with said slots and arranged to discharge into said coin receptacle, a manually movable member, coin releasable means associated with each of said chutes for normally preventing movement of said manually movable member in one direction and for automatically arresting the same after moving in said direction for a predetermined distance upon being released by the coin, means to prevent retrograde movement of said manually movable member, manually operable means associated with said coin releasable means for rendering any desired ones of the same inoperative, whereby the register may be set for reception of coins aggregating any desired predetermined premium, said last named means embodying a removable element whereby the remaining coin releasable means may only be released by the operation of a coin, and means operable to close any desired ones of said slots.

3. In an insurance cash register of the character described, a casing provided with a coin receptacle and having slots to receive coins of different denominations, lock controlled means for preventing unauthorized access to said coin receptacle, depending coin chutes associated with said slots and arranged to discharge into said coin receptacle, a manually movable member, coin releasable means associated with each of said chutes for normally preventing movement of said manually movable member in one direction and for automatically arresting the same after moving in said direction for a predetermined distance, upon being released by the coin, means to prevent retrograde movement of said manually movable member, manually operable means associated with said coin releasable means for rendering any desired ones of the same inoperative whereby the register may be set for reception of coins aggregating any desired predetermined premium, said last named means embodying a removable element whereby the remaining coin releasable means may only be released by the operation of the coin, and means associated with the manually operable means for rendering the coin releasable means inoperative by closing the slots of the chutes associated therewith.

In testimony whereof I affix my signature.

FORREST L. PRUETT.